United States Patent Office 3,160,674
Patented Dec. 8, 1964

3,160,674
ALKYLATION PROCESS
Lawrence G. Cannell, Lafayette, Calif., and George Holzman, Alton, Ill., assignors to Shell Oil Company, New York, N.Y., a corporation of Delaware
No Drawing. Filed Aug. 11, 1964, Ser. No. 388,928
6 Claims. (Cl. 260—683.59)

This invention relates to an improved process for the preparation of high octane components by alkylating isoparaffins with olefins in the presence of an acid catalyst.

Alkylation of isobutane with butenes in the presence of an acid catalyst is well known. Since the installation, in the late 1930's, of the first commercial process employing sulfuric acid as the catalyst, the alkylation process has grown rapidly in use and importance. Alkylation capacity in the United States alone is reported to be in excess of 400,000 barrels per stream day with additional capacity under construction or planned. Sulfuric acid and hydrofluoric acid are the principal acids used in the commercial process, sulfuric acid being the catalyst predominantly used. Therefore, this invention will be described with regard to sulfuric acid, but should not be limited to it.

Commercial sulfuric acid alkylation processes are described, for example, in "Petroleum Refiner," 32, No. 9, 105–109 (September 1953), "Petroleum Refiner," 30, No. 9, 152–159 (September 1951), and "Petroleum Processing," 12, No. 4, 107–109 (April 1957). In brief, isobutane and olefin feed are injected into a suitable reaction zone where the alkylation reaction takes place in the presence of the sulfuric acid catalyst. The acid and hydrocarbon are sufficiently agitated or mixed to form an emulsion with acid as the continuous phase. This emulsion is circulated and cooled to remove heat liberated in the alkylation reaction. A portion of the circulating emulsion is removed to a settling zone for separation of the hydrocarbon product and acid, which is returned to the reactor.

For satisfactory emulsions with normal power input for mixing, a mix comprising at least about 42–50% acid and 50–58% hydrocarbon by volume is usually required. With emulsions containing less than 40–50% acid, the yield and quality of alkylate drops rapidly. This break point varies from plant to plant and is affected by acid strength, whether the acid is fresh or reconcentrated, feed analysis, type of mixer, and mixing horsepower. Thus, when an H₂SO₄-hydrocarbon emulsion containing below about 40–50% acid is used, the emulsion withdrawn from the reactor generally contains less acid than that in the reactor, possibly due to settling or emulsion resolution within the reaction zone. Somewhat improved results are obtained with "tight" emulsions, i.e., those which are sufficiently emulsified that separation of the acid and hydrocarbon does not occur readily. Tighter emulsions are generally the result when the acid content of the emulsion is increased to 60–65% by volume or higher.

Tight emulsions produced by higher acid contents do present disadvantages, however, in that they require additional mixing power, reduce heat transfer efficiency in emulsion coolers, and require longer settling times in the product recovery system where the hydrocarbon product is recovered from the acid. Resolution of some of these disadvantages is the subject of Canadian Patent 576,550, issued May 26, 1959, to Rollman et al. In view of disadvantages with very high acid contents in the emulsion, it is generally considered that emulsions containing about 50% acid and 50% hydrocarbon are about optimum for most alkylation units.

The alkylation mechanism is complex and is accompanied by side reactions such as isomerization, polymerization, cracking and the like. Consequently, other hydrocarbons such as hexanes, heptane, nonanes, decanes, and the like are produced in addition to the octanes. These side reactions are undesirable in that they reduce yield and quality of the alkylate product and often tend to foul the catalyst. Loss in yield and high acid consumption is attributed primarily to the formation of high boiling compounds and hydrocarbon complexes with the acid. Olefins are highly reactive particularly in the presence of the acid catalyst. Highly unsaturated hydrocarbons are formed by polymerization and dehydrogenation (by hydrogen transfer) of a portion of the olefin feed. As used herein, the term "olefin" will be used to designate the monoolefins such as propene, butene, pentenes, or event di- and tri-butenes, which are readily available and are commonly employed as alkylation feeds. With hydrofluoric acid alkylation, acid consumption is not as great a problem as with sulfuric acid alkylation as spent hydrofluoric acid can very readily and continuously be regenerated by a simple distillation.

Other unsaturated hydrocarbons encountered in a petroleum refinery are the polyunsaturated compounds such as diolefin and acetylenic hydrocarbons. Butadiene and isoprene are perhaps the most widely known from their use in the manufacture of synthetic rubber. The polyunsaturated hydrocarbons are extremely reactive chemically and are a valuable raw material for the production of many useful chemicals. In addition, they will alkylate with isobutane to form octane, such as the reaction shown below for butadiene:

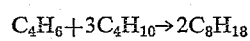

$$C_4H_6 + 3C_4H_{10} \rightarrow 2C_8H_{18}$$

However, in practice, little butadiene enters into the alkylation reaction since it polymerizes quite rapidly.

The polymerization tendency of butadiene is well known from acid-catalyzed olefin polymerization processes which were developed prior to the advent of the alkylation process. With this in mind, considerable concern was expressed by early workers in the alkylation art that the formation of high-boiling polymers from butadiene might be deleterious to the quality of butene alkylate. Laboratory batch experiments by Birch et al. (Journ. of Inst. of Pet. Tech., 24, page 319, June 1938) indicated there were no ill effects to the quality of butene alkylate resulting from the presence of butadiene in the butene feed. Indeed, the quality of butadiene light alkylate actually is very high as the alkylate comprises about 80% octanes which are predominantly trimethylpentanes.

In spite of the high quality of light alkylate from butadiene, the presence of butadiene in olefin feed to an alkylation unit is considered highly undesirable and is avoided if possible. Because of the rapid polymerization of butadiene, the yield of alkylate from butadiene is extremely low, being as low as about 10–15% of the theoretical yield (422% w., based on the weight of butadiene). More importantly, however, the polymer from butadiene reacts with and is soluble in the acid, causing extremely high acid consumption even when the butadiene is present in the feed in very low concentrations. It is generally considered that a concentration of diolefins above about 2–3% of the olefin reactants is usually sufficient to render the alkylation economically impractical because of high acid consumption. The excessive acid consumption attributable to butadiene can be estimated by figuring that each gallon of butadiene contaminates or spends about 58 pounds of fresh acid from 98% down to 90% H₂SO₄. On the other hand, butene alkylate is made in some plants with acid consumption as low as 0.25 pound per gallon of alkylate while in other plants the consumption may run up to 0.8 pound of acid per gallon of alkylate.

The detrimental effect of diolefins such as butadiene in acid alkylation process has supplied considerable incentive to find means for removing the butadiene from alkylation feed or for converting it to a less harmful compound. Methods proposed heretofore have been to precontact an alkylation feed with such materials as acid clays, phosphoric acid or dilute sulfuric acid to polymerize selectively the diolefins which then can be removed conveniently by distillation or to precontact the alkylation feed with catalysts such as molybdenum sulfide or nickel sulfide to hydrogenate selectively the diolefin to the corresponding monoolefin. More recently, selective hydrogenation of butadiene over a cobalt molybdate hydrogenation catalyst has been disclosed by Viland, U.S. Patent No. 2,934,574. No simple and inexpensive means for the removal of small percentages of butadiene from an alkylation feed has yet been developed; therefore in the usual alkylation process butadiene, if present in the feed in only very minor amounts, has been tolerated since to remove it is more expensive than the amount of acid which it expends.

The object of this invention is to provide an improved process for alkylating isoparaffins with olefins. It is a further object of this invention to provide an improved process for the alkylation of butadiene or olefins containing butadiene. It is another object of this invention to increase alkylate yield and reduce acid consumption in alkylation process for the alkylation of olefins containing butadiene.

It has now been found that polyunsaturated hydrocarbons, such as diolefins and acetylenic compounds, are excellent feeds to an alkylation process when the alkylation reaction is carried out under special conditions. More particularly, it has been found that diolefins, such as butadiene, can be alkylated to high yields and with low acid consumption by maintaining an unconventionally low amount of acid in the reaction zone relative to the hydrocarbon phase present and by maintaining a critical low diolefin space velocity. In the process of the invention the yield of alkylate from butadiene is not only improved over that obtained in alkylation processes in use heretofore, but the yield of alkylate realized from alkylating butadiene generally is even higher than that obtained from the conventional alkylation of butenes. Moreover, in the process of the invention acid consumption is markedly reduced since the butadiene is alkylated with such a very high efficiency that only as little as about 3% of the diene is obtained as an acid-soluble polymer. This is indeed quite unexpected and surprising when it is considered that heretofore butenes have been regarded as the most desirable olefin for alkylating isobutane and that butadiene, if present, is highly undesirable and should be removed prior to contact with the acid catalyst.

Another advantage of the invention is that the relatively low amount of acid in the reaction zone permits improved heat transfer. In alkylation, heat transfer is reduced as acid content increases such as, for example, from an increase in acid content to 60% from 50% in the circulating emulsion. This is because of lower heat transfer rates with acid compared to those with hydrocarbon. Moreover, with operation at low acid contents in the reactor, reduced settler capacity is required as the acid-hydrocarbon emulsion breaks relatively quickly.

In the process of the invention, the amount of acid in the reaction zone is from about 5 to about 30%, and preferably from about 15 to about 25%, based on the volume of the reaction zone. The reaction zone in this context is taken to be the total volume of the reaction mixture, i.e., the total volume of acid plus hydrocarbon. Within this concentration range the acid is generally, but not always, present as the dispersed phase, i.e., droplets of acid dispersed in the hydrocarbon phase. It is important, therefore that the acid and hydrocarbon be well agitated to provide small acid droplets which are highly dispersed in the hydrocarbon. Under certain conditions mixed phases can occur, such as a hydrocarbon phase and a phase of hydrocarbon in acid.

It is also essential to successfully carry out the process of the invention that the space velocity of the diolefin be maintained within certain critical limits. Diolefin space velocity must be maintained below about 0.05, preferably below about 0.03, especially 0.001–0.03 volume diolefin per volume catalyst per hour. When the present space velocity and acid/hydrocarbon ratio limits are observed, yields of alkylation based on diolefin are above about 300% w.; when either variable departs substantially from the critical range, yields drops markedly.

As long as the essential limitations are met as to the amount of acid in the reaction zone and as to the space velocity of diolefin as described above, the benefits of the invention are obtained generally regardless of the concentration of the polyunsaturated olefin in the feed. However, the invention is especially effective when there are small amounts of diolefin in a monoolefin feed. Substantially pure monoolefin streams can be handled in conventional manners, but mixed feeds are more difficult to alkylate because optimum conditions vary considerably for the various constituents. Therefore, to obtain the benefits of the invention to a substantial degree, it is generally desired that the olefin feed contain at least 0.2% by volume polyunsaturated olefin, preferably 0.2–10%, more especially 0.4–5%. Should a concentrated fraction of polyunsaturated olefins be available, such as from rubber or other chemical plants, however, it can be used per se or blended with available olefin feed streams to obtain an alkylation feed enriched in polyunsaturated olefins.

The process of the invention is particularly adapted to the use of olefinic hydrocarbon fractions containing from $C_3$ through $C_7$ carbon atoms per molecule and containing a relatively high concentration of polyunsaturated olefins. For example, a $C_4$ fraction recovered from the thermal cracking of petroleum oils or the catalytic cracking of petroleum oils at high severity is a particularly suitable feed. An especially preferred feed to the process of the invention is a $C_4$ fraction obtained from the so-called two-stage catalytic cracking process, such as described in U.S. Patent No. 2,956,003 to Marshall et al.

The olefin feed fraction can be a hydrocarbon predominantly of one carbon number, such as $C_3$, $C_4$, $C_5$ or $C_6$ cracked fraction, or a hydrocarbon fraction containing a plurality of carbon numbers per molecule, such as a mixed $C_4/C_5$ cracked fraction or a light catalytic cracked fraction containing $C_3$ through $C_7$ hydrocarbons. Some of the commonly known polyunsaturated olefins within the preferred feed range are, for example, propadiene, methyl acetylene, butadiene, isoprene, pentadienes and the hexadienes. The benefits of the invention are obtained to a much greater extent with acyclic diolefins than with cyclic diolefins, which are more difficult to alkylate.

It is important in alkylation processes that isobutane be present in the reaction zone in substantial excess over that theoretically required to alkylate all the olefin. A mol ratio of isobutane to olefin of 4:1 to about 10:1 is usually maintained. Actually, a better indication of excess isobutane present is the percent isobutane in the reactor hydrocarbon effluent, which is maintained preferably in excess of 50% by volume and more preferably in excess of 60% by volume. This excess isobutane is recovered and recycled to the reactor.

Additional isobutane, referred to as fresh isobutane, is supplied to the reaction zone to replace isobutane consumed in the reaction and that lost in processing. A portion or all of such isobutane may be supplied in the olefin feed stream. Extraneous isobutane is added as necessary. It is preferred to mix well the olefin feed and the isobutane feed, including isobutane recycle, prior to contact with the acid catalyst. This premixing of isobutane and olefin increases the chance that the highly reactive olefin will be in fairly intimate contact with isobutane for the alkylation reaction rather than contact additional olefin for polymerization reactions. Although reference has been made to isobutane, it is to be realized that other isoparaffins, for example isopentane and isohexane, can be alkylated as well in accordance with the process of the invention.

The alkylation reaction is carried out at a temperature in the range from about 0° C. to about 30° C. and preferably from 4° C. to 16° C., and pressure in the range from atmospheric to about 135 p.s.i.g., but sufficiently high to maintain the reactants in liquid phase. The titratable acidity of the sulfuric acid employed as catalyst is generally in the range from 85% to 100% $H_2SO_4$ and preferably between 88% and 98% $H_2SO_4$.

The following examples illustrate the advantages of the process of the invention and show how it may be carried out.

EXAMPLE I

Several experiments were conducted on the alkylation of isobutane with 1,3-butadiene in the presence of concentrated sulfuric acid. The reaction was carried out in a stirred reaction vessel equipped with baffles to assure good mixing. The stirrer speed was 8000 r.p.m. in each experiment.

Changes in the phase ratio of acid to hydrocarbon were obtained by controlling the amount of acid (96% $H_2SO_4$) and the amount of inert hydrocarbon (n-dodecane) initially present in the reaction vessel. The average acid/hydrocarbon ratio was determined by calculating the average volume of the hydrocarbon phase (from the initial and final values) and dividing this into the volume of acid.

After flushing air out of the system, the acid and any n-dodecane present at the start of the run were saturated with isobutane before starting the butadiene feed. A cooled solution of butadiene in n-dodecane was pumped into the reaction zone at a rate to provide the desired space velocity (volume of butadiene per hour per volume of catalyst in the reaction zone). Isobutane was supplied automatically to the reaction zone on demand as the reaction proceeded. The reaction was carried out at a temperature of 0° C. and at a pressure slightly above atmospheric.

Data are presented in the following Table I.

were carried out under the claimed conditions and produce very high yields (407% and 363% w., basis butadiene). Run 5 is essentially the same as Run 4, except that the diolefin space velocity has been raised out of the critical range, from 0.03 to 0.19, with a corresponding loss in yield from 363% to 138%. Yields drop very quickly when the space velocity is lifted out of the critical range, as is evident from comparing the yields of Runs 3, 4, and 5. Run 6 was conducted at an acid/hydrocarbon ratio outside the claimed range, and in Run 7 the space velocity was also slightly outside the critical limits. The poor performance of these runs is clear from the low yields obtained.

EXAMPLE II

Radioactive tracer techniques were used to study the alkylation of butadiene in admixture with mixed monoolefins. The feed comprised about 2% w. $C^{14}$ labeled 1,3-butadiene in approximately a 1:1 mixture of isobutylene and 1-butene. The $C^{14}$ tagged butadiene (labeled in the 2-position) was obtained as a concentrate from Research Specialties Company of Richmond, California. About 10 microcuries of $C^{14}$ were used in each experiment.

The apparatus and procedure used in these experiments were the same as outlined in Example I except in the method of olefin addition. For low acid/hydrocarbon run the $C^{14}$ labeled butadiene was dissolved with isobutylene and 1-butene in 60 cc. of n-dodecane and the solution was cooled and pumped over a 2-hour period into the reaction vessel containing 50 cc. of 96% w. $H_2SO_4$ and 100 cc. of n-dodecane. In the high acid/hydrocarbon run the $C^{14}$ labeled butadiene only was dissolved in 10 cc. of n-dodecane and the solution was pumped over a 46-minute period into the reaction vessel containing 250 cc. of 96% w. acid and no n-dodecane at the start of the run. The monoolefins, isobutylene and 1-butene, were fed as gases by metering each gas separately through a wet-test meter and drying tubes after which the monoolefins were mixed and passed to the reaction vessel.

At the end of each run, the acid phase and hydrocarbon phase were separated for measurement and analysis. The acid phase was analyzed for water by the Karl Fischer method and for total carbon by the wet combustion method, which uses chromic acid to oxidize the organic matter. An additional wet combustion analysis of the acid was made to determine the $C^{14}$ content. However, instead of absorbing the $CO_2$ in Ascarite it was collected

*Table I*

ALKYLATION OF ISOBUTANE AND 1,3-BUTADIENE AT 0° C.

| Run Number | 1 | 2 | 3 | 4 | 5 | 6 | 7 |
| --- | --- | --- | --- | --- | --- | --- | --- |
| Conditions: | | | | | | | |
| Acid/hydrocarbon ratio | 4.8 | 5.0 | 0.23 | 0.22 | 0.21 | 1.1 | 1.2 |
| Butadiene LHSV | 0.002 | 0.05 | 0.003 | 0.03 | 0.19 | 0.003 | 0.12 |
| Isobutane in hydrocarbon phase, percent v | 41 | 30 | 43 | 44 | 49 | 36 | 25 |
| Products, percent w. basis $C_5+$ alkylate: | | | | | | | |
| $C_5$ | 1.3 | 3.0 | 1.6 | 2.2 | 4.3 | 1.6 | 3.1 |
| $C_6$ | 1.4 | 2.4 | 1.7 | 2.7 | 4.9 | 1.5 | 2.1 |
| $C_7$ | 1.1 | 1.9 | 2.0 | 2.0 | 3.0 | 1.2 | 1.6 |
| $C_8$ 2,2,4-TMP | 30.3 | 32.3 | 29.2 | 23.0 | 18.7 | 36.2 | 19.5 |
| DMH | 11.8 | 7.1 | 4.8 | 4.9 | 5.3 | 5.7 | 4.1 |
| TMP (other than 2,2,4-) | 41.2 | 30.2 | 48.9 | 34.9 | 34.9 | 53.5 | 28.8 |
| | 83.3 | 69.6 | 82.9 | 62.8 | 58.9 | 95.4 | 52.4 |
| $C_9$ | 0.4 | 1.9 | 0.2 | 1.2 | 1.4 | 0.3 | 1.4 |
| $C_{10}$ | 0.2 | 0.3 | 0.5 | 0.8 | 1.1 | (a) | 0.6 |
| $C_{11}$ | 0.2 | 0.8 | 2.5 | 0.6 | 3.4 | (a) | 0.8 |
| $C_{12}$ | } 12.1 { | 4.4 | 6.7 | 8.1 | 6.3 | (a) | 4.7 |
| $C_{13}+$ | | 15.7 | 1.9 | 19.6 | 16.7 | (a) | 33.3 |
| Yield $C_5+$ alkylate, basis $C_4H_6$ | 197 | 79 | 407 | 363 | 138 | 233 | 57 | a Analysis based on light alkylate only due to presence of heavy foreign material on GLC column which obscured $C_{10}+$.

From these data the critical nature of acid/hydrocarbon ratio and diolefin space velocity is clear. Runs 1 and 2 were conducted at high acid/hydrocarbon ratios but low diolefin space velocities; yields were poor. Runs 3 and 4 in a liquid nitrogen cooled cold trap and then transferred to an ionization chamber for measurement of $C^{14}$ activity. The $C^{14}$ activities of the hydrocarbon product and the activities of the butadiene feed solutions were determined in a liquid scintillation counter. As seen from the data presented in Table II, at a constant low space velocity, loss of butadiene to the acid was greatly reduced with alkylation at low acid/hydrocarbon ratios.

*Table II*

ALKYLATION OF $C^{14}$ LABELED 1,3-BUTADIENE IN ISOBUTYLENE/1-BUTENE

| Run Number | 8 | 9 |
|---|---|---|
| Conditions: | | |
| Acid/hydrocarbon ratio | 0.21 | 4.5 |
| Diolefin/olefin feed composition: | | |
| 1,3-Butadiene (percent w.) | 2.7 | 1.6 |
| Isobutylene (percent w.) | 50.2 | 51.1 |
| 1-Butene (percent w.) | 47.1 | 47.3 |
| Liquid Hourly Space Velocity: | | |
| 1,3-Butadiene | 0.003 | 0.003 |
| Isobutylene | 0.062 | 0.097 |
| 1-Butene | 0.058 | 0.090 |
| Total $C_4H_8$ | 0.120 | 0.187 |
| Isobutane in hydrocarbon phase, percent vol | 43 | 36 |
| Distribution of $C^{14}$ in Products: | | |
| Organic phase, percent of total activity | 97.29 | 77.59 |
| Acid phase, percent of total activity | 2.71 | 22.41 |
| Products, percent w. basis $C_5+$ Alkylate: | | |
| $C_5$ Isopentane | 5.2 | 6.2 |
| $C_6$ 2,3-DMB+2MP | 5.7 | 5.5 |
| 3-MP | 0.5 | 0.7 |
| $C_7$ 2,4-DMP | 3.0 | 3.4 |
| 2,3-DMP | 1.6 | 1.7 |
| $C_8$ 2,24-TMP | 27.9 | 22.8 |
| 2,4 2,5-DMH+2,2,3-TMP | 7.2 | 7.8 |
| 2,3,4-, 2,3,3-TMP+2,3-, 3,4-DMH | 37.3 | 22.3 |
| $C_9$ 2,2,5-TMH | 1.5 | 7.1 |
| Other $C_9H_{29}$ | 0.7 | 2.2 |
| $C_{10}$ | 1.0 | 4.0 |
| $C_{11}$ | 1.2 | 3.0 |
| $C_{12}$ | 5.6 | 8.7 |
| $C_{13}+$ | 1.6 | 4.6 |
| | 100.0 | 100.0 |

EXAMPLE III

Experiments on the alkylation of isobutane with isoprene and trans-piperylene were conducted with apparatus and procedure similar to that of Example I. The alkylations were conducted at 0° C., at a stirring rate of 8000 r.p.m., with 96% w. $H_2SO_4$ as the catalyst and with n-pentane as diluent in place of n-dodecane.

For runs at the high acid to hydrocarbon ratio the acid became much darker in color and very stable emulsions were formed, which is indicative that much of the diolefin undergoes polymerization reactions in the acid-rich emulsions. The stable emulsions also affected recovery of the organic phase so that alkylate yields are only good approximations.

Data are given in Table III.

EXAMPLE IV

A cracked gasoline of 158° F. end point was used for alkylation of isobutane. The gasoline consisted of about 60% by weight of hydrocarbons of five carbon atoms per molecule and 40% by weight of hydrocarbons having six carbon atoms per molecule. The olefin content of the gasoline was about 60% and the diolefin content was about 2%. Using a feed containing 18.5% of the treated gasoline, 75.7% of isobutane and 5.8% of normal butane and propane, the alkylation was carried out in the presence of a volume of sulfuric acid of 100% initial concentration equal to the volume of hydrocarbon in the reactor, i.e. the amount of acid was 50% based on the reaction zone volume. The alkylation temperature was 10° C. and the contact time averaged 20 minutes. Alkylation acid life at 85% acidity was 6.0 volumes of product per volume of acid. A sample of the gasoline was pre-treated with sulfuric acid of 65% concentration to remove substantially all of the diolefins and then alkylated under similar conditions as the raw gasoline. An acid life of 14.0 was obtained which is indicative of the effect of diolefins on acid consumption. On the other hand, alkylation of the raw gasoline with an amount of sulfuric acid equal to 15% of the reactor volume in accordance with the present invention not only increases acid life as does diene removal, but the dienes are substantially recovered as alkylate rather than lost as acid-soluble polymer.

EXAMPLE V

A hydrocarbon feed suitable for the practice of the invention is a $C_4$ fraction comprising in addition to butenes, primarily butene-2, 0.69% 1,3-butadiene, 0.05% 1,2-butadiene, 46 p.p.m. ethyl acetylene, 31 p.p.m. vinyl acetylene, and 1200 p.p.m. dimethyl acetylene, all on a weight basis. When this hydrocarbon feed and isobutane are alkylated at 20° C. with concentrated sulfuric acid in an amount equal to 26% of the reaction zone volume and at diolefin space velocities below about 0.03, a high yield of alkylate and a high acid life are obtained.

This application is a continuation-in-part of Serial No. 78,258, filed December 27, 1960, now abandoned.

We claim as our invention:

1. A continuous process for alkylating an isoparaffin having from 4 to 6 carbon atoms per molecule with a $C_3$ to $C_7$ unsaturated hydrocarbon consisting essentially of a major amount of monoolefin and a minor amount of at least 0.2% by volume diolefin which comprises contacting said isoparaffin with said unsaturated hydrocarbon at a temperature of about 0° to about 30° C. in the liquid phase with concentrated sulfuric acid and at a liquid hourly space velocity of diolefin of less than about 0.03 volume diolefin per volume sulfuric acid per hour, main-

*Table III*

ALKYLATION OF ISOBUTANE AND $C_5$ DIOLEFINS AT 0° C.

| Diolefin | trans-Piperylene | | | Isoprene | |
|---|---|---|---|---|---|
| Conditions: | | | | | |
| Acid/hydrocarbon ratio | 0.18 | 0.16 | 22.7 | 0.16 | 23.6 |
| Diolefins LHSV | 0.0032 | 0.0036 | 0.0029 | 0.0033 | 0.0031 |
| Isobutane in hydrocarbon phase, percent | 51.1 | 53.7 | 50.8 | 52.3 | 50.2 |
| Products, percent w. basis $C_5+$ alkylate: | | | | | |
| $C_5$ Isopentane | 19.7 | 22.3 | 10.0 | 22.5 | 9.5 |
| $C_6$ 2,3-DMB+2-MP | 1.8 | 1.6 | 0.6 | 1.3 | 0.7 |
| 3-MP | | | 0.1 | | 0.1 |
| $C_7$ 2,4-DMP+2,2,3-TMB | 0.6 | 0.5 | 0.2 | 0.7 | 0.2 |
| 2,3-DMP+MH | | 0.5 | 0.2 | 0.4 | 0.2 |
| $C_8$ 2,2,4-TMP | 19.6 | 19.2 | 15.8 | 29.3 | 15.5 |
| 2,5-, 2,4-DMH+2,2,3-TMP | 3.0 | 2.3 | 2.0 | 3.5 | 2.0 |
| 2,3,4-, 2,3,3-TMP+2,3-, 3,4-DMH | 21.6 | 21.7 | 16.8 | 31.2 | 18.4 |
| $C_9$ 2,2,5-TMH | 14.8 | 17.4 | 3.1 | 5.4 | 0.7 |
| $C_{10}$ | 1.9 | 1.5 | 0.8 | 1.0 | |
| $C_{11}$ | 2.4 | 1.0 | 2.4 | 0.7 | 10.0 |
| $C_{12}$ | 1.8 | 1.2 | 1.9 | 1.1 | 0.6 |
| $C_{13}+$ | 8.3 | 4.5 | 45.1 | 1.8 | 41.6 |
| | 100.0 | 100.0 | 100.0 | 100.0 | 100.0 |
| Yield $C_5+$ alkylate, basis diolefin | 400 | 410 | a 38 | 430 | a 53 | a Only partial recovery of organic phase as result of stable emulsion.

taining vigorous agitation of the contact mixture with the acid, and maintaining an amount of acid in the reaction mixture of from about 15% to about 25% by volume of the total volume of acid-hydrocarbon mixture.

2. The process of claim 1 wherein the diolefin is butadiene.

3. A continuous process for alkylating an isoparaffin having from 4 to 6 carbon atoms per molecule with a $C_3$ to $C_7$ unsaturated hydrocarbon consisting essentially of a major amount of monoolefin and a minor amount of at least 0.2% by volume diolefin which comprises contacting said isoparaffin with said unsaturated hydrocarbon at a temperature of about 0° to about 30° C. in the liquid phase with concentrated sulfuric acid and at a liquid hourly space velocity of diolefin of less than about 0.03 volume diolefin per volume sulfuric acid per hour, maintaining vigorous agitation of the contact mixture with the acid, and maintaining an amount of acid in the reaction mixture of from about 15% to about 25% by volume of the total volume of acid-hydrocarbon mixture, thereby obtaining a yield of butadiene-derived alkylate of at least 300% by weight calculated on the basis of butadiene.

4. The process of claim 3 wherein the isoparaffin consists essentially of isobutane.

5. A continuous process for alkylating a $C_4$ to $C_6$ isoparaffin with a $C_3$ to $C_7$ unsaturated hydrocarbon consisting essentially of a major amount of monoolefin and about 0.2 to 10% by volume diolefin which comprises contacting the isoparaffin with the unsaturated hydrocarbon at a temperature of about 0° to about 30° C. in the liquid phase with concentrated sulfuric acid and at a liquid hourly space velocity of from 0.001 to 0.03 volume diolefin per volume sulfuric acid per hour, maintaining vigorous agitation of the contact mixture with the acid, and maintaining an amount of acid in the reaction mixture of from about 15% to about 25% by volume of the total volume of acid-hydrocarbon mixture.

6. The process of claim 5 wherein the diolefin is butadiene.

No references cited.

ALPHONSO D. SULLIVAN, *Primary Examiner.*